O. TEICHMANN.
MACHINE FOR WORKING DOUGH AND THE LIKE.
APPLICATION FILED JULY 10, 1912.
1,096,810.
Patented May 12, 1914.
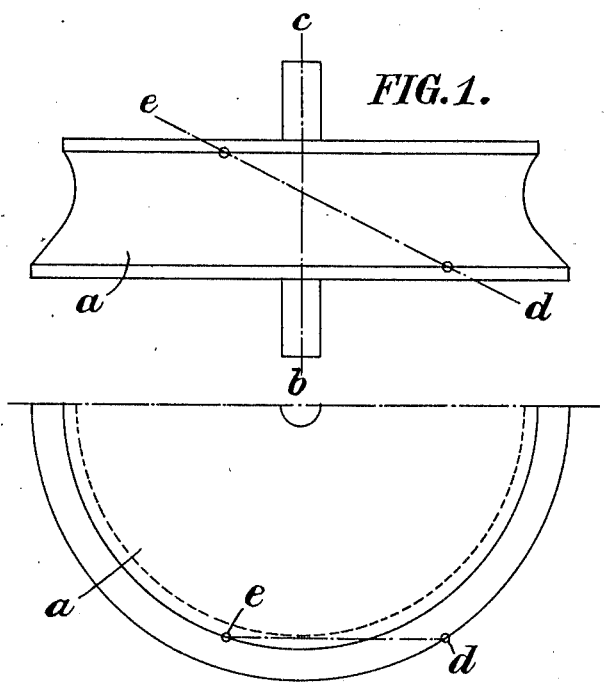
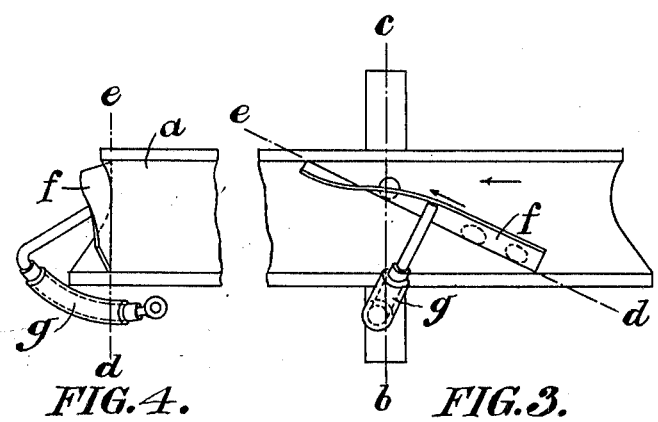
Witnesses
Inventor
Otto Teichmann.
By E. E. Vrooman,
his Attorney.

UNITED STATES PATENT OFFICE.

OTTO TEICHMANN, OF CANNSTATT-STUTTGART, GERMANY.

MACHINE FOR WORKING DOUGH AND THE LIKE.

1,096,810. Specification of Letters Patent. Patented May 12, 1914.

Application filed July 10, 1912. Serial No. 708,672.

*To all whom it may concern:*

Be it known that I, OTTO TEICHMANN, a subject of the German Emperor, residing at Cannstatt-Stuttgart, in the Empire of Germany, have invented certain new and useful Improvements in Machines for Working Dough and the like, of which the following is a specification.

The present invention relates to dough-working machines of that kind in which a dough carrier is moved past an obliquely placed forming surface so that the dough is rolled and simultaneously caused to move laterally.

The invention consists in forming the surface of the dough carrier as a frustum of a hyperboloid of revolution, on a generator of which is located the straight stripping edge of a forming surface which is preferably adjustable about this edge.

In Figures 1 and 2 of the drawings a side view and an axial view of a dough carrier in accordance with this invention are shown. Figs. 3 and 4 show two different views of the forming surface located on the dough carrier.

The carrier wheel $a$, the working surface of which is a frustum of a hyperboloid of revolution, has the axis of rotation $b$, $c$. A generator of the working surface, along which the forming surface $f$ is to lie, is indicated by the straight line $d$, $e$. The forming surface $f$ can be formed as a twisted stripping knife Figs. 3 and 4 which at all points has a suitable inclination to the working surface. If desired, and according to the condition or character of the dough to be worked, a trough of suitable form can also be used. In any case the inclination of the forming trough or stripping knife with regard to the working surface of the wheel can be arranged to be suitably adjusted so that dough balls of the desired size can be made without any part of the machine having to be changed.

An example of an arrangement having for its object to render possible the inclination of the forming trough is shown in Figs. 3 and 4. The trough, in this case, is guided in a member $g$ curved in the arc of a circle, the center of which lies in the stripping edge $d$, $e$, and the plane of which is vertical to the stripping edge. The dough to be worked may be delivered to the wheel at the lower end of the forming surface $f$ and is then rolled upward along this surface, from which it is removed either by hand or by means of a suitable delivery or transport device.

As shown in the drawing, the preferable part of a hyperboloid of revolution to employ for the purpose of the present invention is the part located in the neighborhood of the throat. In this part the angles which the stripping edge makes with the tangents to circles formed by horizontal sections of the carrier body are comparatively small, whereas at a distance from the throat these angles approach the value of a right angle. Too close an approach to this value prevents the obtaining of the proper working action on the dough.

Although in the preceding description dough working apparatus is spoken of for the sake of brevity, the invention is not to be considered as limited thereby to devices for working dough in the narrowest sense of the word. The operation of the invention is also applicable to plastic masses of any kind.

I declare that what I claim is:—

1. A machine for working plastic material comprising a rotary carrier member having its surface concave transversely to its direction of movement, a forming member disposed across the surface of the carrier member obliquely to the direction of movement of that surface, and having on the side adjacent the said surface a stripping edge, the form of the surface of the carrier member being derived by taking the said stripping edge in its working position as generator and rotating it about the axis of the carrier member.

2. A machine for working plastic material comprising a rotary carrier member having its working surface formed as a frustum of a hyperboloid of revolution, and a forming member having a straight line stripping edge adapted to lie in the position of a generator of the hyperboloid.

3. A machine for working plastic material comprising a rotary carrier member having its working surface formed as a frustum of a hyperboloid of revolution, a forming member having a straight line stripping edge adapted to lie in the position of a generator of the hyperboloid, and means for angularly adjusting the said forming member about its stripping edge.

4. A machine for working plastic material comprising a rotary carrier member having its working surface formed as a frustum of a hyperboloid of revolution, and a forming member having a straight line stripping edge adapted to lie in the position of a generator of the hyperboloid, said forming member having the shape of a strip twisted about the stripping edge.

5. A machine for working plastic material comprising a rotary carrier member having its working surface formed as a frustum of a hyperboloid of revolution, a forming member having a straight line stripping edge adapted to lie in the position of a generator of the hyperboloid, said forming member having the shape of a strip twisted about the stripping edge, and means for angularly adjusting the said forming member about its stripping edge.

6. A machine for working plastic material comprising a rotary carrier member having its working surface formed as a frustum of a hyperboloid of revolution including the throat of the hyperboloid, and a forming member having a straight line stripping edge adapted to lie in the position of a generator of the hyperboloid across the throat thereof.

In witness whereof, I have hereunto signed my name this 27th day of June 1912, in the presence of two subscribing witnesses.

OTTO TEICHMANN.

Witnesses:
  FRIDE KLAIBER,
  ERNEST ENTENMANN.

---

Copies of this patent may be obtained for five cents each, by addressing the "Commissioner of Patents, Washington, D. C."